United States Patent [19]

Liau et al.

[11] 4,432,840

[45] Feb. 21, 1984

[54] PREVENTION OF POLYMER BUILDUP IN POLYMERIZATION REACTORS USING THIN ORGANIC COATINGS BY ELECTROLYSIS OF PHENOL

[75] Inventors: Shung-Chung Liau; Wei-Min Cheng; Uen-Long Young, all of Kaohsiung, Taiwan

[73] Assignee: Formosa Plastics Corporation, China

[21] Appl. No.: 372,076

[22] Filed: Apr. 26, 1982

[51] Int. Cl.³ ............................................... C25D 7/04
[52] U.S. Cl. .................................. 204/14 N; 204/26; 427/235; 427/236; 422/241
[58] Field of Search ................... 204/14 N, 26, 59 R; 427/235, 236; 422/241

[56] References Cited

U.S. PATENT DOCUMENTS

| | | | |
|---|---|---|---|
| 2,961,384 | 11/1960 | McKinney | 204/14 N |
| 3,335,075 | 8/1967 | Borman | 204/59 R |
| 4,080,173 | 3/1978 | Cohen | 204/14 N |
| 4,200,712 | 4/1980 | Cohen | 422/241 |
| 4,231,851 | 11/1980 | Mengoli | 204/14 N |
| 4,334,054 | 6/1982 | Dubois | 204/14 N |

*Primary Examiner*—John F. Niebling
*Attorney, Agent, or Firm*—Brumbaugh, Graves, Donohue & Raymond

[57] ABSTRACT

A method of effectively preventing the buildup of polymers on the internal surfaces of polymerization reactors by coating the inner surfaces with a thin organic film produced by electrolysis of phenol or phenol derivatives in a solution of a Lewis Base and a non-aqueous solvent.

23 Claims, No Drawings

PREVENTION OF POLYMER BUILDUP IN POLYMERIZATION REACTORS USING THIN ORGANIC COATINGS BY ELECTROLYSIS OF PHENOL

This invention relates to an improved method of coating the inner walls of polymerization reactors to substantially reduce or eliminate polymer scale adhesion on the inner walls of the reactors, on the surfaces of agitators and on other equipment attached thereto. Further, the present invention provides a novel process for coating the inner surfaces of a polymerization reactor with a thin film which is substantially pinhole-free and, therefore, prevents the monomer or monomers from contacting the inner walls of the reactor and substantially reduces corrosion of the walls of the reactor.

BACKGROUND OF THE INVENTION

Polymer scale which builds up on the walls of reactors during polymerization causes a problem for polymer manufacturers. Polymer scale deposited on the various surfaces within the polymerization reactor causes a decrease in polymer yield and a reduction in the cooling capacity of the polymerization reactor. Further, the polymer scale deposited on the surfaces tends to come off and enters into the polymer product, resulting in production of a polymer product of lower quality. Furthermore, the removal of scale from the inner surfaces after each polymerization run requires large amounts of labor and time, resulting in the reduction of productivity. Additionally, inhalation of volatile monomers, especially vinyl chloride during the scale-removing operation causes serious health problems.

To solve such problems, a number of methods have been proposed to prevent polymer scale deposition, specifically in the suspension polymerization of vinyl chloride or a monomer mixture composed mainly of vinyl chloride. In some methods ingredients are added during the polymerization reaction itself. In other methods the walls of the reactor are sprayed with an inert film containing scale preventing agents, such as dyes or condensation polymer. These prior art methods have, in fact, been successful in some cases for the commercial production of polyvinylchloride (PVC) resin. But certain disadvantages still exist.

The present invention is an electrochemical method. The well-known compound, phenol and its alkyl derivatives are weak acids with pK values of about 10 (in water). The electrochemical oxidation of these phenol compounds produces thermoplastic polymers of high molecular weight having linear or cross-linked structures, especially where the procedure is carried out in a non-aqueous system. In the present invention phenol, its halo and/or alkyl derivatives are electrolyzed using a non-aqueous solvent and a Lewis Base. The polymer which is formed is filtered and dissolved in an alkali solvent. Thereafter the alkali solution can be diluted with water and applied to the inner surfaces of a polymerization vessel. This coating prevents the deposit of scale on the surfaces. The coating being substantially pinhole-free also prevents pass through of monomers to the inner surfaces of the reactor during polymerization.

SUMMARY OF THE INVENTION

It has now been found that the inner surfaces of a polymerization reaction vessel, particularly one having inner surfaces of stainless steel, may be coated with a film comprised of thermoplastic polymers of high molecular weight having linear or cross-linked structures whereby undesirable buildup of polymers of ethylenically unsaturated monomer and monomers other than vinyl chloride on the reactor walls can be substantially decreased and in many cases entirely eliminated.

In the present invention, a solution which contains phenol or its halo- or alkyl derivatives and a Lewis Base in a non-aqueous solvent is electrolyzed. An electrochemically oxidized phenolic compound comprised of thermoplastic polymer of high molecular weight having linear or cross-linked structures is produced. The polymer can then be dissolved in an alkali solvent and applied to the internal surfaces of a polymerization reactor by conventional methods. As a result of this invention there is almost no problem with polymer scale buildup.

DETAILED DESCRIPTION

We have invented the method of the present invention wherein the inner surfaces of the reactors are coated with a thin, virtually pinhole-free organic film comprised of thermoplastic polymers of high molecular weight having linear or cross-linked structure produced by electrolysis of phenol and its halo and alkyl derivatives.

The electrochemical oxidation of phenol or its derivatives leads to the production of high molecular weight polymers with linear or cross-linked structures which can be used to form a pinhole-free thin coating on the inner surfaces of polymerization reactors. The thin organic film is insoluble in organic solvents and water, and is soluble only in strongly alkaline solutions. Therefore, the inner surfaces of the reactor do not come into contact with the polymerization medium, and scale buildup is prevented. The electrolysis procedure of the invention is carried out in a non-aqueous system. The electrolytic bath is a solution of the water-free phenol compound in a polar solvent such as ethylene dichloride. About 0.1 to about 0.5 mole of Lewis Base, such as aniline, per mole of phenol or phenol derivative is added to promote the ionization of phenol or phenol derivative and makes the solution conductive. Preferably the concentration is about 0.25 mole of Lewis Base per mole of phenol or phenol derivative. The main components of the system are phenol molecules, negatively charged phenoxy ions, and positively charged phenylaminium ions.

When an electric current is passed through the electrolytic bath, the ions of phenylaminium migrate to the cathode and hydrogen is evolved. Phenoxy ions are discharged at the anode. The phenoxy ions form to polymer with a polyphenylene-ether structure:

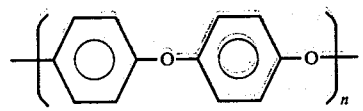

The polymer produced is insoluble in the electrolyte and after isolation and purification has a soften point between 100° C. to 350° C.

If phenol is used as the electrolyte and a platinum anode is used, the phenolic polymer formed is found at the bottom of the electrolytic cell and has the following crosslinked structure.

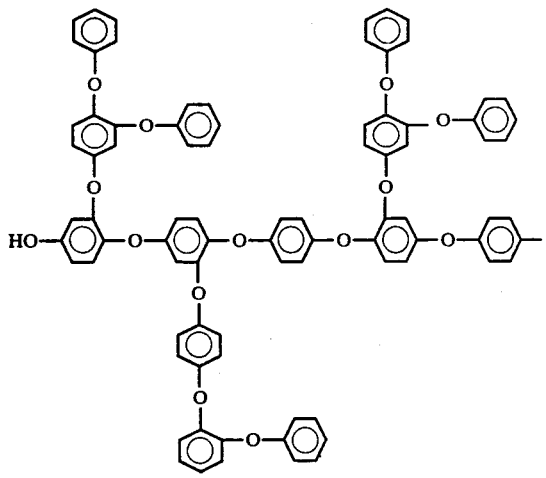

The phenol compounds, as mentioned above, may be the phenol or phenol derivatives which have the structure

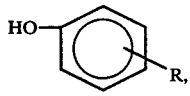

where R is hydrogen, halide or alkyl. The quantity and properties of phenolic compound produced in the electrolytic bath depends on the voltage, current density, electrolysis time and the like. The non-aqueous solvent used in the electrolytic bath may be ethylene dichloride (EDC), acetonitrile, dichlorobenzene, methanol, methylnitrile, or the like. The Lewis Base may be aniline, triethylamine, pyridine or other suitable electron donors. The preferred quantity of Lewis Base is about 0.25 mole per mole of phenol or phenol derivative.

In a preferred embodiment the phenolic compound produced in the electrolytic bath is filtered and dissolved in a 45% alkali solution. The resulting alkali solution is diluted with water such that the final solution contains 0.2% electrolyzed phenol and 5% alkali. The diluted solution is applied to the internal surfaces of a polymerization vessel by spraying. However, the cooling solution can be applied by flooding the polymerization vessel and then draining it, by painting or brushing the coating solution directly onto the initial surfaces of the vessel or by any other method known in the art. The preferred weight of the coating is about 0.1 g/M$^2$ to about 0.5 q/M$^2$. After the coating solution is applied the internal surfaces are sprayed with water and a neutralized organic thin layer is formed. The film produced by this invention absolutely prevents the contact of the polymerization medium with the surfaces of the reactor. Additionally, polymers produced in the reactor do not adhere to the coating produced in this invention, therefore, the problems of scale buildup are substantially reduced.

After the polymerization reactor is treated in the method described herein, polymerization is carried out by normal commercial methods, such as charging demineralized water and removing oxygen therefrom, adding a suspension agent, an initiator and the selected monomers. Polymerization is initiated by heating at a temperature as required for a period of from about 2 to 12 hours with agitation being applied throughout the course of the reaction. When the reaction is completed, the pressure will drop and unreacted monomer is removed. Then, the polymer is removed and the inner walls of the reactor are rinsed by water.

The ratio of monomer to water employed in the aqueous polymerization is not a particularly critical factor and is about 1:1 to 1:5 and preferably about 1:1.5 to 1:3. The total amount of monomer can be added to the polymerization system before the polymerization is begun. Alternatively, the monomer can be added in stages or continuously during the polymerization depending on the polymer desired.

The polymerization initiator employed is not a critical factor and may be an organic peroxide or hydroperoxide such as benzoyl peroxide; redox agents such as persulfates plus reducing agents, or hydroperoxides plus ferrous ion, e.g., sodium formaldehyde sulfoxylate or hydrogen peroxide plus a ferrous salt. Azo compounds such as azobisisobutyronitrile and organometallic reagents such as silver alkyls may also be used as the polymerization initiator. The amount of initiator used is about 0.001 to 1 part by weight per 100 parts by weight of the monomer.

Also included is a suspension agent such as methyl cellulose, gelatin and the like. About 0.05 to 5% of the suspension agent, based on the total weight of monomer, is used.

The polymerization temperature varies depending on the kind and composition of the monomer. Generally, the temperature is in the range of about 0° C. to 150° C. The preferred temperature is in the range of about 20° C. to 100° C.

The method of the present invention is especially suitable for use in heterogeneous free radical polymerization wherein the polymer formed separates out of the polymerization mixture as the polymerization reaction proceeds. Monomers particularly suitable include: vinyl chloride; vinylidene halides; vinyl esters, such as vinyl acetate and vinyl propionoate; acrylic acid; and methacrylic acid and esters.

The following examples illustrate the method of the present invention in further detail. These examples are given solely by way of illustration of the instant invention and are not to be construed to limit it. In each of the examples only one quanitity, such as the electromotive force, the amount of electric current, or the concentration of Lewis Base used is varied and the other quantities are kept constant. All parts and percentage are by weight unless otherwise specified.

EXAMPLE I

A electrolytic cell with a rotatory platinum anode and a stationary platinum cathode was filled with a 1,2-dichloroethane solution containing about 2% phenol and about 0.5% aniline. The anode and the cathode were connected to an electric source. The electric current density was set at 1 mA/cm$^2$, and the voltage was set at 200 V. Electrolysis was carried out at 25° C. After 2 hours the electric source was removed. The deposit was filtered and dissolved in 45% sodium hydroxide solution. The dissolved polymer was diluted with water into a solution containing about 0.2% electrolyzed phenol polymer and about 5% sodium hydroxide based on weight of the solution. Thereafter, the diluted solution was sprayed on the inner surfaces of a polymerization reactor in the amount of about 0.32 g/M$^2$. The inner surfaces were rinsed with water and a neutralized organic layer was formed. Thereafter, the following were added to the reactor for polymerization.

| Vinylchloride Monomer | 50 kg |
| Demineralized Water | 80 kg |
| KH-17* | 40 g |
| ABVN** | 15 g |

*78% hydrolyzed PVA
**azobisdimethylvaleronitrile

The temperature was maintained at about 57° C. until the reactor's pressure dropped 1 kg/cm$^2$. The reactor was then emptied and rinsed with water. The amount of scale which built up was recorded and then the polymerization process was repeated. The results obtained are set forth in Table I. The amount of buildup was rated from 0 to 10 with 0 being no buildup and 10 being the amount of buildup from a control run wherein the inner surfaces of the reactor were not coated.

TABLE I

| No. of run | Non-coated | Coated |
|---|---|---|
| 1 | 10 | 0 |
| 2 | — | 0 |
| 3 | — | 0 |
| 5 | — | 0 |
| 7 | — | 0 |
| 10 | — | 1 |
| 13 | — | 2 |
| 17 | — | 4 |
| 21 | — | 7 |
| 25 | — | 10 |

EXAMPLE II

An electrolytic cell with a rotatory platinum anode and a stationary platinum cathode was filled with the non-aqueous solution described in Example I using the procedure described in Example I up to the point where the electric source was attached. At this point, the electric current density was fixed at 1 mA/cm$^2$ and the voltage was varied using: (A) 20 V, (B) 100 V, (C) 200 V, and (D) 500 V. Electrolysis was carried out for about 2 hours at about 25° C. Thereafter the deposit was removed and treated as described in Example I and a neutralized organic layer was formed on all of the inner surfaces of the polymerization reactor. The reactor was filled with the polymerization reactants of Example I and polymerization was carried out as described in Example I. Observations were made of the amount of buildup at the end of each run. The results are set forth in Table II.

TABLE II

| No. of run | A | B | C | D |
|---|---|---|---|---|
| 1 | 1 | 0 | 0 | 0 |
| 2 | 0 | 0 | 0 | 1 |
| 3 | 1 | 0 | 0 | 3 |
| 5 | 2 | 0 | 0 | 5 |
| 7 | 5 | 1 | 0 | 9 |
| 10 | 9 | 2 | 1 | 10 |
| 13 | 10 | 5 | 2 | — |
| 17 | — | 8 | 4 | — |
| 21 | — | 10 | 7 | — |
| 25 | — | — | 10 | — |

The best results were obtained when the voltage was 200 V.

EXAMPLE III

An electrolytic cell with a rotatory platinum anode and a stationary platinum cathode was filled with the nonaqueous solution described in Example I using the procedure described in Example I up to the point where the electric source was attached. At this point, the voltage was fixed at 200 V and the electric current density was varied using: (A) 0.2 mA/cm$^2$, (B) 1 mA/cm$^2$, (C) 2 mA/cm$^2$ and (D) 10 mA/cm$^2$. Electrolysis was carried out for about 2 hours at about 25° C. Thereafter the deposit was removed and treated as described in Example I and a neutralized organic layer was formed on all the inner surfaces of the polymerization reactor. The reactor was filled with the polymerization reactants of Example I and polymerization was carried out as described in Example I. Observations were made of the amount of buildup at the end of each run. The results are set forth in Table III.

TABLE III

| No. of run | A | B | C | D |
|---|---|---|---|---|
| 1 | 0 | 0 | 0 | 0 |
| 2 | 0 | 0 | 0 | 0 |
| 3 | 0 | 0 | 0 | 0 |
| 5 | 1 | 0 | 0 | 1 |
| 7 | 3 | 0 | 1 | 2 |
| 10 | 5 | 1 | 2 | 5 |
| 13 | 9 | 2 | 5 | 9 |
| 17 | 10 | 4 | 8 | 10 |
| 21 | — | 7 | 10 | — |
| 25 | — | 10 | — | — |

The results indicate that the preferred range of electric current density is from about 1 mA/cm$^2$ to 2 mA/cm$^2$.

EXAMPLE IV

An electrolytic cell as described in Example I was filled with a 1,2 dichlorobenzene solution containing about 2% phenol and about 0.5% triethylamine and the procedure described in Example I was used. Observations were made of the amount of buildup at the end of each run. The results set forth in Table IV compare the results in Example I with the results in Example IV.

TABLE IV

| No. of run | 1,2 dichloroethane with aniline | 1,2 dichlorobenzene with triethylamine |
|---|---|---|
| 1 | 0 | 0 |
| 2 | 0 | 0 |
| 3 | 0 | 0 |
| 5 | 0 | 0 |
| 7 | 0 | 0 |
| 10 | 1 | 1 |
| 13 | 2 | 2 |
| 17 | 4 | 5 |
| 21 | 7 | 8 |
| 25 | 10 | 10 |

The tests showed that selection of a particular Lewis Base or polar solvent does not seriously affect the results of the present invention.

EXAMPLE V

An electrolytic cell with a rotary platinum anode and a stationary platinum cathode was filled with the nonaqueous solution described in Example I using the procedure described in Example I up to the point where the electric source was attached. The amount of Lewis Base was varied: (A) 0.025 mole, (B) 0.1 mole, (C) 0.25 mole and (D) 0.5 mole per mole of phenol. Electrolysis was carried out at 25° C. for about 2 hours at a current density of about 1 mA/cm² and a voltage of 200 V. Thereafter the deposit was removed as described in Example 1 and a neutralized organic layer was formed on all the inner surfaces of a polymerization reactor as described in Example I. Polymerization was carried out as described in Example I. Observations were made of the amount of buildup at the end of each run. The results are set forth in Table V.

TABLE V

| No. of run | A | B | C | D |
|---|---|---|---|---|
| 1 | 0 | 0 | 0 | 0 |
| 2 | 0 | 0 | 0 | 0 |
| 3 | 1 | 0 | 0 | 0 |
| 5 | 2 | 0 | 0 | 0 |
| 7 | 5 | 1 | 0 | 1 |
| 10 | 8 | 2 | 1 | 2 |
| 13 | 10 | 5 | 2 | 5 |
| 17 | — | 9 | 4 | 7 |
| 21 | — | 10 | 7 | 10 |
| 25 | — | — | 10 | — |

We claim:

1. A method for substantially preventing the buildup of polymers on the internal surfaces of polymerization reactors comprising dissolving an electrolytically formed phenolic polymer in a strongly alkali solvent to form an alkali solution and coating the internal surfaces of the polymerization reactors with said alkali solution.

2. A method for substantially preventing the buildup of polymers on the internal surfaces of polymerization reactors comprising forming a thermoplastic polymer by electrolysis of a phenolic solution and a Lewis Base, dissolving said polymer in a strongly alkali solvent to form an alkali solution and coating the internal surfaces of the polymerization reactors with said alkali solution.

3. The method as defined by claim 2 wherein said thermoplastic polymer is formed at an anode by electrolysis at a fixed voltage and at a fixed current density.

4. The method as defined in claim 2 wherein said phenolic solution is a phenolic compound in a polar solvent.

5. The method as defined in claim 4 wherein said phenolic compound has the structural formula

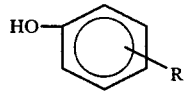

wherein R is selected from the group consisting of hydrogen, halide and alkali.

6. The method as defined by claim 5 wherein R is hydrogen.

7. The method as defined by claim 5 wherein R is Cl.

8. The method as defined by claim 5 wherein R is an alkyl having 1–12 carbon atoms.

9. The method as defined by claim 4 wherein the polar solvent is selected from the group consisting of 1,2-dichloroethane, acetonitrile, dichlorobenzene, methanol, and methylnitrile.

10. The method as defined by claim 4 wherein concentration of the phenolic compound is from about 1% to about 10% by weight of said polar solvent.

11. The method as defined by claim 2 wherein the Lewis Base is selected from a group consisting of aniline, triethylamine and pyridine.

12. The method as defined by claim 2 wherein the concentration of the Lewis Base is from about 0.1 to 0.5 mole per mole of the phenolic compound.

13. The method as defined by claim 3 wherein said anode is rotational platinum.

14. The method as defined by claim 3 wherein the fixed voltage is from about 200 V to about 300 V.

15. The method as defined by claim 3 wherein the fixed current density is from about 1 mA/cm² to about 2 mA/cm².

16. The method as defined by claim 3 wherein the fixed voltage is about 200 V.

17. The method as defined by claim 1 or 2 comprising the further step of rinsing the internal surfaces of the polymerization reactor with water subsequent to coating.

18. The method as defined by claim 1 or 2 comprising the further step of diluting the strongly alkali solution with water prior to coating the internal surfaces.

19. The method as defined by claim 1 or 2 wherein said strongly alkali solution is from about 30% to about 45% sodium hydroxide.

20. The method as defined in claim 18 wherein the concentration of the diluted coating solution is about 0.1% to about 1% by weight of electrolyzed phenolic compound.

21. The method as defined by claim 18 wherein the concentration of the diluted coating solution is about 1% to to about 10% by weight of alkali.

22. The method as defined by claim 21 wherein the alkali is sodium hydroxide.

23. The method as defined by claim 1 or 2 wherein weight of said coating is about 0.1 g/M² to about 0.5 g/M².

* * * * *

UNITED STATES PATENT AND TRADEMARK OFFICE
CERTIFICATE OF CORRECTION

PATENT NO. : 4,432,840
DATED : February 21, 1984
INVENTOR(S) : Liau et al.

It is certified that error appears in the above—identified patent and that said Letters Patent is hereby corrected as shown below:

Column 3, lines 47-48, "cooling" should read --coating--;

Column 3, line 53, "$q/M^2$" should read --$g/M^2$--;

Column 8, line 47, "defined in" should read --defined by--.

Signed and Sealed this

Tenth Day of July 1984

[SEAL]

Attest:

Attesting Officer

GERALD J. MOSSINGHOFF
Commissioner of Patents and Trademarks